Sept. 29, 1931.  M. J. OWENS  1,825,416
MEANS FOR DELIVERING CHARGES OF MOLTEN GLASS
Original Filed Aug. 3, 1920  2 Sheets-Sheet 1
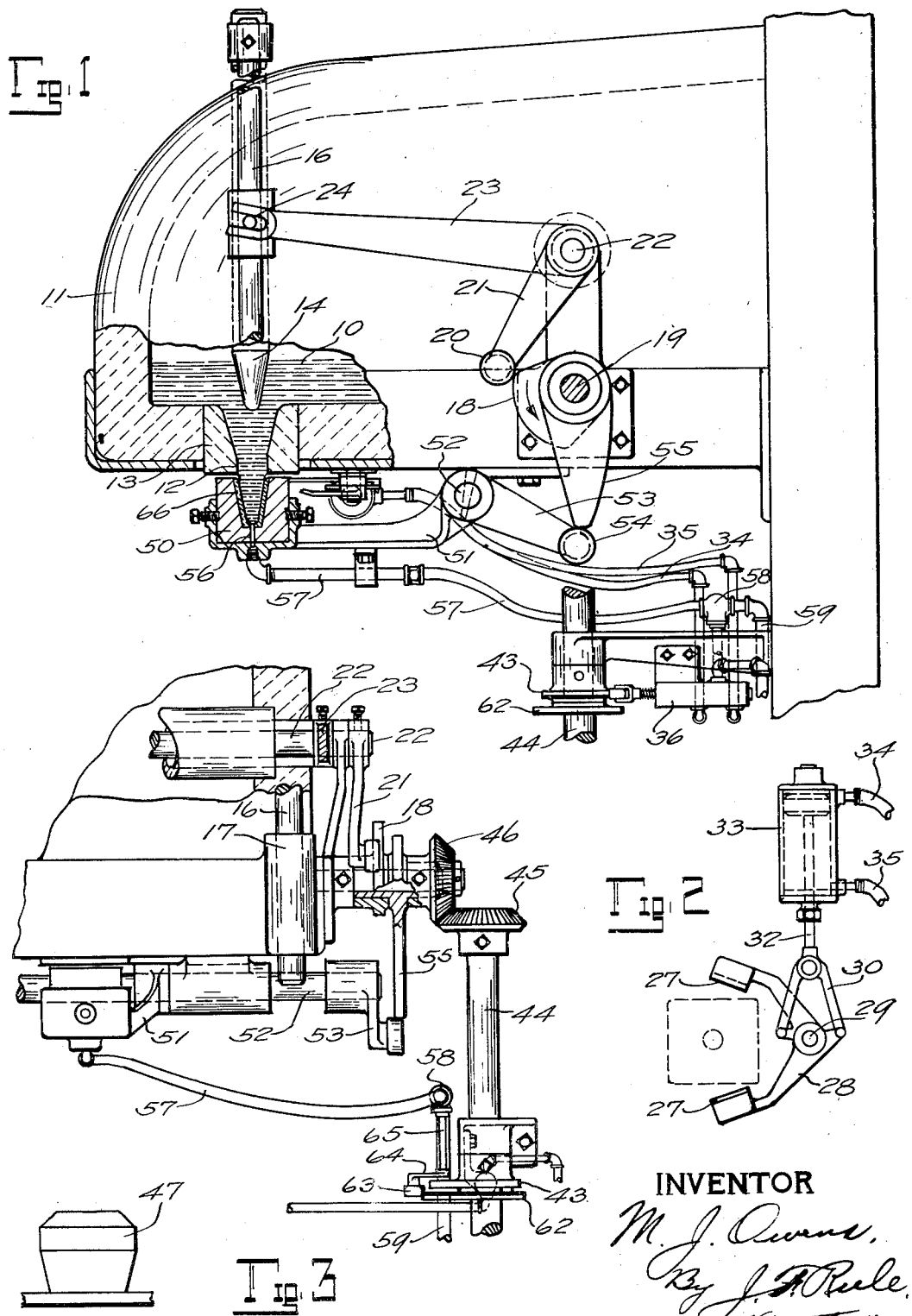
INVENTOR
M. J. Owens.
By J. F. Reele.
His attorney.

Sept. 29, 1931.  M. J. OWENS  1,825,416
MEANS FOR DELIVERING CHARGES OF MOLTEN GLASS
Original Filed Aug. 3, 1920   2 Sheets-Sheet 2
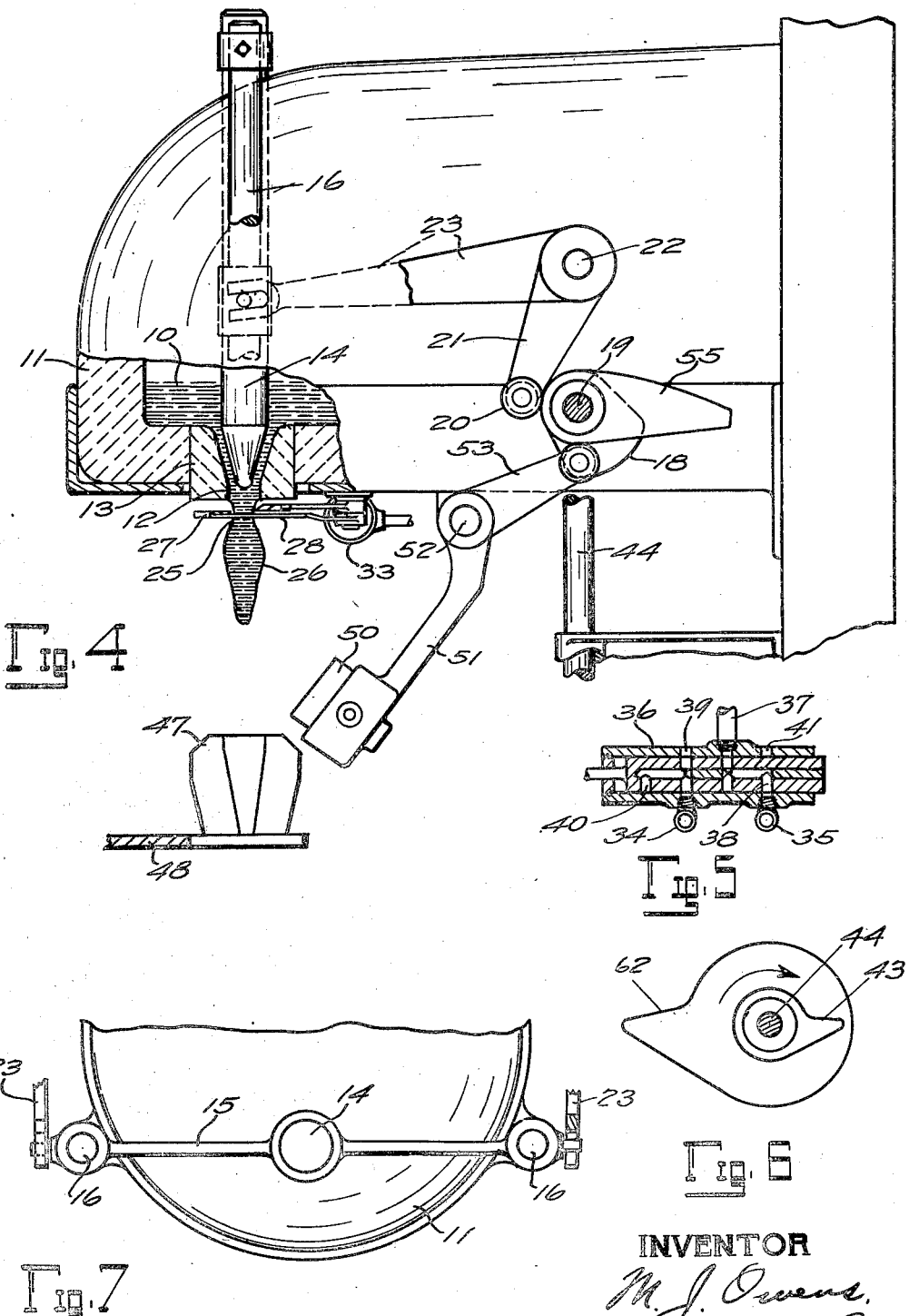
INVENTOR
M. J. Owens.
By J. F. Rule
His attorney.

Patented Sept. 29, 1931

1,825,416

UNITED STATES PATENT OFFICE

MICHAEL J. OWENS, OF TOLEDO, OHIO, ASSIGNOR TO OWENS-ILLINOIS GLASS COMPANY, OF TOLEDO, OHIO, A CORPORATION OF OHIO

MEANS FOR DELIVERING CHARGES OF MOLTEN GLASS

Application filed August 3, 1920, Serial No. 400,921. Renewed October 17, 1927.

My invention relates to apparatus for forming and delivering charges of molten glass to molds, and particularly to means for giving the desired shape to the charges or gobs before they enter the molds.

There are at present in use various forms of apparatus for delivering charges of glass en masse to the molds, by permitting the glass to flow through an outlet opening in the bottom of a furnace boot or other receptacle, and either accumulating the flowing glass in a forming cup, or causing it to accumulate in a mass suspended from the outlet orifice. In the latter case, the flow of glass and shape of the gobs are controlled to a greater or less extent by some controlling means, as for example, a vertically reciprocating plug projecting downward into the glass above the outlet. The tendency of apparatus of this kind is to form a thick blunt lower end on the gob. A gob of this shape is unsuited for entering and taking the form of molds for narrow neck bottles or other narrow neck ware. Other irregularities or undesirable shapes of the suspended gobs are sometimes produced in the operation of such apparatus. The operation of the shears also distorts the glass to a greater or less extent. Further, slight variations in the temperature of the glass or other operating conditions also result frequently in pronounced variations in the shape of the gob. On the other hand, if the glass is accumulated in a forming cup, it is unduly chilled by extended contact with the cold walls of the cup.

An object of the present invention is to overcome these difficulties and to provide suitable means for forming a tapered or pointed lower end on the gob, or otherwise shaping it as may be desired to conform to the shape of the mold without chilling the glass. In carrying out my invention I provide a forming cup or element adapted to be brought into position to engage the lower end of the gob of glass as it issues from the orifice, and means for automatically creating a partial vacuum within the forming device, by which the glass is drawn into and shaped by the forming device. The forming cup is then quickly withdrawn so that the gob after being severed may drop into a mold beneath. The forming cup is only in contact with the glass for an instant, so that there is no detrimental chilling of the glass, such as takes place with the usual forming cups, in which the glass is allowed to accumulate. The cup cavity, moreover, may be lined with a suitable non-conducting material such as is commonly used in paste molds to prevent any chilling tendency.

Other features and advantages of the invention will appear hereinafter.

In the accompanying drawings:

Figure 1 is a part sectional elevation of a gob forming apparatus constructed in accordance with the principles of my invention.

Figure 2 is a diagrammatic plan view of the cutter and its operating motor.

Figure 3 is a part sectional front elevation of the apparatus, parts being broken away.

Figure 4 is a view similar to Figure 1, but with the parts in a different position.

Figure 5 is a sectional detail view of the valve controlling the knife operating motor.

Figure 6 is a view of the cams controlling the vacuum and air supply to the forming cup and knife operating motor.

Figure 7 is a fragmentary top plan view showing the plunger carrying yoke.

A continuous supply of molten glass 10 is maintained in the furnace boot or extension 11 and is permitted to flow therefrom through an outlet orifice 12 in a bushing 13 in the floor of the boot. The flow of glass is regulated and controlled by a regulator 14 which, as shown, consists of a vertical plug or plunger adapted to move up and down in the glass directly over the outlet 12. The plug 14 is adjustably mounted in a yoke 15 extending across the top of the boot and connected at its ends to vertical guide rods 16 which are slidable up and down in stationary guiding sleeves 17. The plunger is actuated by means of a cam 18 fixed to a continuously rotating shaft 19, which cam engages cam rolls 20 on rock arms 21 keyed to a rock shaft 22. Also keyed to said rock shaft are forwardly extending arms 23 having a connection 24 at their forward ends with the rods 16.

It will be seen that with this construction the cam 18 will operate during each complete rotation to lift and hold the plunger 14 in the Figure 1 position for a predetermined period of time and then permit the plunger to be moved downward by gravity to the Figure 4 position. The downward movement of the plunger assists in forcing outward a mass or gob of glass. The upward movement of the plunger tends to draw the glass upward, thereby reducing its diameter and forming a neck 25 (Fig. 4). The gob of glass 26 is severed about the time the plunger commences its upward movement, by a cutter comprising shear blades 27 carried on arms 28 pivoted at 29. Said arms are connected through links 30 to a piston rod 32 of a piston motor 33. Air is supplied to this motor through pipes 34 and 35 connected to a valve 36 (Fig. 5) to which is also connected a pipe 37 leading to a source of compressed air. When the valve is in the Figure 5 position, the air pressure is admitted through a port 38 to the pipe 35, the pipe 34 being connected to the outside air through a port 39. When the valve piston is moved to the right, the pressure pipe 37 is connected through a port 40 to the pipe 34, while the pipe 35 is opened through a port 41 to the outside air. The valve 36 is operated by a cam 43 secured to a continuously rotating vertical drive shaft 44 which has a driving connection through bevel gears 45 and 46 with the cam shaft 19.

The gobs 26 when severed are permitted to drop into molds 47 mounted on a rotary carriage 48 on a glass forming machine. As shown, the molds 47 are inverted parison molds of a narrow neck bottle forming machine. In order that the gobs may properly enter and take the shape of the molds, it is desirable that the lower ends of the gobs be tapered or pointed to conform approximately to the shape of the mold cavity. In order to thus form the gobs, I provide a forming element or cup 50 adapted to be moved up to a position directly beneath and in close proximity to the outlet orifice, so as to engage the glass issuing therefrom. As the cup engages the glass, a vacuum or partial vacuum is created within the cup, thereby causing the glass to quickly draw into the cup cavity and assume a tapered shape corresponding to that of the cup cavity. The cup is then quickly withdrawn, so that the suspended gob when severed, may drop into the mold beneath. The forming cup is removably mounted in a rock arm 51 keyed to a rock shaft 52 to which is also secured a rock arm 53 carrying a cam roll 54 which runs on a cam 55 secured to the shaft 19. The cam 55 is so formed and adjusted that it swings the forming cup upward and shapes the lower end of the charge before the major portion of the glass forming said charge has issued from the outlet. It will be understood, however, that the forming cup may be brought into operation at any time during the formation of the gob. The cup is held up for just an instant and then permitted to drop down to the Figure 4 position. While the cup is in its operative position the air is exhausted therefrom through a port 56 in the bottom of the cup connected through a pipe 57, valve 58, and pipe 59 to a vacuum tank. The valve 58 is an ordinary two way valve adapted to connect the pipe 57 alternately to the vacuum pipe 59 and the atmosphere. The valve 58 is actuated by a cam 62 on which runs a roll 63 on a rock arm 64 connected to the stem 65 of the valve. The cam 62 is so formed and timed that vacuum or air exhaustion is applied only momentarily, and that while the forming cup is in the Figure 1 position. The degree of vacuum and length of time it is applied may be so adjusted, if desired, that the glass will not be drawn down with sufficient force to fill the cup, but will merely be drawn downward sufficiently to give the desired tapered formation.

It will be noted that for each revolution of the drive shaft 44, each of the cams 62, 43, 55 and 18 is given one complete revolution, the cams being timed and arranged to effect the synchronized operation of the several parts controlled thereby, in proper timed relation. The shape of the forming cup may, of course, be varied to give any desired shape to the lower portion of the gob formed therein. The cup may be made of iron or other metal, and if desired, may comprise a lining 66 of material such as ordinarily used in paste molds, or other suitable insulating material. Said forming cup may also be used in combination with any approved means for regulating the flow of glass, such as air pressure and vacuum, and various other regulating devices known in the art.

Modifications may be resorted to within the spirit and scope of my invention.

What I claim is:

1. The combination of a container for molten glass, having a downwardly directed discharge orifice through which the glass issues downwardly, means for periodically severing charges of glass below said orifice, a hollow forming device, means to move said device into momentary contact with the charge of glass issuing from the orifice and then withdraw it from the glass before the charge of glass is severed, and means to exhaust the air from said device.

2. The combination of a container for molten glass, having a discharge orifice through which the glass issues, means for periodically severing the glass below said orifice, a hollow forming device, means to move said device into momentary contact with the glass issuing from the orifice and to withdraw the device before the glass is severed, and means to produce a partial vacuum in said device while in contact with the glass and to then restore the air pressure before said device is withdrawn.

3. The combination of means for producing a suspended gob of plastic glass, a mechanical shaping device, means to bring said device into a position to enclose the lower end of the suspended gob and then withdraw said device, and positive means momentarily applying a downward force to bring said end into contact with the device to shape the end.

4. The combination of means for producing a suspended gob of plastic glass, a mechanical shaping device having a shaping cavity, means to bring said device into momentary contact with a portion of the suspended gob and withdraw said device while the gob is still suspended, and means to exhaust air from said cavity while the shaping device is in contact with the suspended gob and thereby shape the glass.

5. The combination of a receptacle to contain molten glass, having a discharge orifice in the bottom thereof through which the glass issues, means to periodically sever the glass, a vacuum cup, and means for momentarily bringing said cup into engagement with the remaining stub of glass after a gob has been severed and withdrawing it from the glass before the latter is severed.

6. The combination of a receptacle to contain molten glass, having an outlet orifice in the bottom thereof, a regulator projecting downward into the glass above said orifice, means to reciprocate said regulator vertically, a forming cup, means to periodically move said cup into position beneath said orifice in synchronism with the movements of the regulator, means to exhaust the air from said forming cup and thereby shape a mass of glass therein, means for withdrawing the cup away from the said mass of glass and from said position beneath the orifice, thereby leaving the mass suspended from the walls of the orifice, and means for severing the mass after the cup is withdrawn.

7. The combination of a receptacle to contain molten glass, having an outlet orifice in the bottom thereof through which the glass issues, means to regulate the discharge of glass and cause it to form a suspended gob depending from said orifice, means to sever said gob, a hollow forming device, means to bring the forming device to the lower end of the suspended gob, and means to exhaust the air from said device while in contact with the glass.

8. The method of forming gobs of molten or plastic glass from a supply body of molten glass within a container, consisting in causing the molten glass to issue from an outlet orifice in the container, momentarily engaging the end of the issuing mass with a forming device and withdrawing the forming device while the issuing mass is still connected with the supply body in the container, and exhausting the air from said device during said engagement with the issuing mass, thereby causing the glass to assume the shape of the forming device.

9. The method which consists in causing molten glass to issue from an orifice, periodically severing the issuing glass while the latter is suspended from the orifice in gob form, and shaping the lower end of each suspended gob by the application thereto of a hollow forming device from which air is exhausted.

10. The combination of a container for molten glass, having a discharge orifice in the bottom thereof, means for regulating the flow of glass through said orifice and causing it to form masses or gobs suspended from said orifice, a cutter operable to sever the gobs, an open ended mold beneath said orifice, the mold cavity being tapered and of larger diameter at its upper end than its lower end, a forming cup, means to move said cup into momentary engagement with the lower end of the suspended gob during its formation, said cup having its cavity tapered to conform approximately to the shape of the tapered mold cavity, and means to exhaust the air from the forming cup while in contact with the glass.

11. The method which consists in causing molten glass to issue from an orifice, shaping a portion of the suspended glass by a force momentarily applied to the surface of the glass outside of the orifice and in a direction away from the orifice, and severing the glass while suspended from the orifice.

12. The method which consists in causing glass to issue from an orifice, shaping the suspended glass by a downward force momentarily applied to the lower surface of the glass beneath the orifice, and severing the glass while suspended.

13. The method which consists in causing glass to issue from an orifice, shaping the suspended glass by a downward force momentarily applied to the glass beneath the orifice, further controlling the discharge by an intermittent force applied to the glass above the orifice, and severing the glass at a point below the orifice after said downward force ceases to operate on the glass connected to the orifice and while the glass is suspended.

14. The combination of a receptacle to contain a supply body of molten glass, said receptacle provided with a discharge orifice in the bottom thereof through which the glass issues, means for periodically severing the issued glass, and means below said orifice to momentarily apply after each severance and prior to the next succeeding severance, a downward force to the glass connected with and protruding from the supply body and causing said force to cease to act before said succeeding severance.

15. The method which consists in causing molten glass to issue downwardly from an orifice in the bottom of a container and causing the glass to be suspended from the walls of the orifice, shaping the suspended glass by a downward force applied thereto by shaping means beneath the orifice, withdrawing the shaping means while the glass remains suspended, severing the suspended glass, and operating on the glass at a point above the orifice to apply an upward force to the glass.

16. The combination of a receptacle to contain molten glass, said receptacle having an opening in the bottom thereof through which the glass issues and from which it is suspended, means below the opening to apply a downward shaping force to the suspended glass, means to then withdraw the shaping means and leave the glass suspended, means to sever the suspended glass after the shaping means has been withdraw, and means above the opening to apply an upward force to the glass.

17. The combination of a receptacle to contain molten glass, said receptacle having an opening in the bottom thereof through which the glass issues and from which it is suspended, means below the opening to apply a downward shaping force to the suspended glass, means to then withdraw the shaping means and leave the glass suspended, means in the glass above the opening for periodically regulating and controlling the flow, and means operable to sever the glass after the shaping means has been withdrawn and while the glass is suspended beneath said opening.

18. The combination of a container for molten glass, having an outlet orifice in the bottom thereof, a plunger projecting into the glass above the orifice, means to periodically reciprocate the plunger whereby charges of glass are extruded and suspended from the orifice, means beneath said orifice operating periodically in synchronism with the movements of the plunger to apply a downward force to each suspended mass of glass and thereby shape the suspended glass, means to then withdraw the shaping means and leave the glass suspended, and means to sever the suspended glass after the shaping means has been withdrawn.

19. The method which comprises maintaining a continuous supply body of molten glass over an outlet orifice of a receptacle and causing the glass to issue from said orifice, operating on the free end of the issuing glass by shaping means outside of the container to taper said end of the glass, separating the tapered end of the glass and the shaping means leaving the glass suspended, applying a force on the glass within the receptacle operating to exert an expelling action on the glass issuing from the orifice, and severing the suspended glass after the separation of the shaping means from the end of the glass.

20. The combination with a container for molten glass, having an outlet opening through which the glass issues and from which it is suspended, of a regulator reciprocating within the glass toward and from said opening and operable during its movement toward the opening to exert an expelling force on the issuing glass, a shaping device located externally of the container, means to move the shaping device into engagement with the issuing glass and draw the glass to a tapered end before said expelling operation of the regulator, and then withdraw the shaping device, and means to sever the suspended glass after the shaping device has been withdrawn.

21. The combination of a container for molten glass, having an outlet orifice in the bottom thereof, of a vertically reciprocating plunger operating within the glass above said orifice, means operable periodically to sever the suspended glass beneath said orifice, and means operable prior to each downward movement of the plunger to engage the suspended glass and draw a tapered end thereon and then withdraw from the glass before the latter is severed.

22. The combination of a container for molten glass, having an opening in the bottom thereof through which the glass issues, a plunger reciprocating vertically in the glass above said opening, means to periodically sever the issuing glass, means to reduce the air pressure on a portion of the surface of the suspended glass and then withdraw, leaving a freely suspended gob of glass, and means to then sever the gob.

23. The combination of a container for molten glass, having an opening in the bottom through which the glass issues and from which it is suspended in a mass, a plunger reciprocating vertically in the glass above said opening, means including a shaping device having a tapered cavity to apply a partial vacuum to the lower portion of the surface of the suspended mass and thereby exert a downward pull on the suspended glass, whereby the lower end of the suspended mass is given a tapered shape, means to remove the shaping device from in contact with the suspended mass, and means to sever said mass after said shaping device has been removed.

24. The process of supplying measured and preshaped mold charges to the molds of a fabricating machine which consists in periodically causing a gravity flow of a measured mass of glass from a continuous supply of molten glass, through the discharge orifice of a container for the glass, catching a portion of each said measured mass in a suitable shaping receptacle, applying a downward force to the portion to impart thereto the desired contour to suit the purposes of the fabricating mold, separating the shaping receptacle from said portion, then shearing the stretched neck, and then delivering the mold charge to the fabricating mold.

25. The process of supplying measured and preshaped mold charges to the molds of a glass forming machine, which consists in periodically causing a gravity flow of a measured mass of glass through the discharge orifice of a container for molten glass, causing a portion of each said mass to enter a shaping receptacle, applying a downward force to the portion to impart thereto the desired contour to suit the purposes of the forming mold, then causing a separation of the shaped portion of the mold charge and shaping receptacle, then shearing the stretched neck, and then causing the mold charge to enter the forming mold.

26. Apparatus for feeding molten glass, comprising a container for the glass having a discharge outlet, means to maintain a continuous supply of glass within the container, shear blades, means for causing said blades to meet beneath the outlet in the path of the issuing glass and sever glass discharged from the container and then withdraw from the path of the glass, a shaping receptacle beneath the shears, and means for moving said receptacle, while the shears are withdrawn, into position to confine laterally a portion of a mold charge of molten glass, vacuum means for causing the confined portion to assume a contour corresponding to the interior of the shaping receptacle, said receptacle being separable from the said charge of glass to allow free suspension of the shaped glass before its severance.

27. The method which comprises causing molten glass to issue from an outlet opening in a receptacle containing molten glass and suspending the glass from the walls of the opening, applying a downward shaping force to the suspended glass by shaping means below the opening, withdrawing the shaping means and leaving the glass suspended, operating on the glass above the opening to periodically regulate and control the flow, and severing the suspended glass beneath the opening.

28. The method which comprises, causing charges of molten glass to be extruded from an outlet orifice in the bottom of a container for the glass and suspended from the walls of the orifice, controlling the discharge by mechanical means periodically reciprocated in the glass above the orifice, applying a downward force to each suspended mass of glass by means beneath the orifice operating periodically in synchronism with the movements of said periodically reciprocating means to thereby shape the suspended glass, withdrawing the shaping means and leaving the glass suspended, and severing the suspended glass.

29. The method of producing preformed charges of molten glass which consists in causing the glass to issue from an outlet orifice in the bottom of a container for the glass, controlling the issuance of the glass by mechanical means periodically reciprocating vertically within the glass above said orifice, periodically severing the suspended glass beneath the orifice, drawing a tapered end on the suspended glass prior to each downward movement of said reciprocating means by external means, and withdrawing said external means in advance of the severance.

30. The method of producing preformed charges of plastic glass which consists in causing the glass to issue from an opening in the bottom of a receptacle containing molten glass, controlling the issuance of the glass by mechanical means reciprocating vertically in the glass above the opening and causing the glass to be suspended at said opening, reducing the air pressure on a portion of the surface of the suspended glass and then withdrawing the pressure reducing means, leaving a freely suspended mass of glass, and then severing the mass.

31. The method of producing preformed charges of molten glass which consists in causing the glass to issue from an outlet opening in the bottom of a receptacle containing molten glass, imparting a predetermined shape to the lower end of the mass of issuing glass by mechanical shaping means engaging the glass, withdrawing the shaping means, causing a continued issuance of the glass after the shaping means has been withdrawn to thereby complete the charge, and severing the completed charge while the latter is still suspended from the orifice and unsupported.

Signed at Toledo, in the county of Lucas and State of Ohio, this 31st day of July, 1920.

MICHAEL J. OWENS.